US012438895B2

United States Patent
Vaidya et al.

(10) Patent No.: US 12,438,895 B2
(45) Date of Patent: Oct. 7, 2025

(54) DETECTING SECURITY THREATS TO DATA ON A STORAGE CONTROLLER

(71) Applicant: International Business Machines Corporation, Armonk, NY (US)

(72) Inventors: Mandar Jayant Vaidya, Pune (IN);
Nilesh Prabhakar Bhosale, Pune (IN);
Joseph W. Dain, Tucson, AZ (US);
Thomas Keith Clark, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 797 days.

(21) Appl. No.: 17/457,064

(22) Filed: Dec. 1, 2021

(65) Prior Publication Data

US 2023/0171273 A1   Jun. 1, 2023

(51) Int. Cl.
*H04L 9/40*     (2022.01)

(52) U.S. Cl.
CPC ........ *H04L 63/1425* (2013.01); *H04L 63/101* (2013.01); *H04L 63/105* (2013.01)

(58) Field of Classification Search
CPC . H04L 63/1425; H04L 63/101; H04L 63/105; H04L 63/20
See application file for complete search history.

(56) References Cited

U.S. PATENT DOCUMENTS

| 8,965,925 | B2 * | 2/2015 | Zoellner | G06F 16/14 |
| | | | | 707/999.009 |
| 9,426,071 | B1 | 8/2016 | Caldejon | |
| 9,967,282 | B2 | 5/2018 | Thomas | |
| 10,127,562 | B2 * | 11/2018 | Price | G06F 21/64 |
| 11,451,569 | B1 * | 9/2022 | Pendse | H04L 67/06 |
| 2009/0290492 | A1 | 11/2009 | Wood | |
| 2016/0182486 | A1 * | 6/2016 | Wu | H04L 9/0891 |
| | | | | 726/28 |
| 2020/0304528 | A1 * | 9/2020 | Ackerman | H04L 63/1433 |

FOREIGN PATENT DOCUMENTS

KR    20160019397 A    2/2016

OTHER PUBLICATIONS

Callahan et al., "VisTrails: Visualization meets Data Management", SIGMOD 2006, Jun. 27-29, 2006, Chicago, Illinois, USA, Copyright 2006 ACM 1-59593-256-9/06/0006, 3 pages.
Cheng et al., "Secure Big Data Storage and Sharing Scheme for Cloud Tenants." Security Schemes and Solutions, China Communications, Jun. 2015, pp. 106-115.
Fang et al., "A Survey of Big Data Security and Privacy Preserving", IETE Technical Review, 2016, <http://dx.doi.org/10.1080/02564602.2016.1215269>, 18 pages.
Shu et al., "IBM Smart Surveillance System (S3): A Open and Extensible Framework for Event Based Surveillance", IEEE Conference on Advanced Video and Signal Based Surveillance, 2005, 6 pages.

* cited by examiner

*Primary Examiner* — S M A Rahman
(74) *Attorney, Agent, or Firm* — Steven M. Bouknight

(57) ABSTRACT

Storage network with controller that includes using deep packet inspection to determine whether a computer file or computer object is sensitive and/or critical, and then, if it is sensitive or critical, applying an artificial intelligence algorithm to determine whether there is a potential threat that is represented by the file or object. If there is a potential threat, then a cyber-resiliency workflow is performed to eliminate or at least mitigate the potential threat.

15 Claims, 2 Drawing Sheets

DETECTING SECURITY THREATS TO DATA ON A STORAGE CONTROLLER

BACKGROUND

The present invention relates generally to the field of storage controllers, and more particularly to security mechanisms and/or methods used in storage controllers to counter various types of security threats, such as malicious attacks by hackers and/or cyber criminals.

The Wikipedia entry for "disk arrays" states, as of 19 Nov. 2021, in part as follows: "A disk array is a disk storage system which contains multiple disk drives. It is differentiated from a disk enclosure, in that an array has cache memory and advanced functionality, like RAID, deduplication, encryption and virtualization. Components of a disk array include:
  Disk array controllers
  Cache in form of both volatile random-access memory and non-volatile flash memory.
  Disk enclosures for both magnetic rotational hard disk drives and electronic solid-state drives.
  Power supplies
Typically, a disk array provides increased availability, resiliency, and maintainability by using additional redundant components (controllers, power supplies, fans, etc.), often up to the point where all single points of failure (SPOFs) are eliminated from the design. Additionally, disk array components are often hot-swappable.
  Traditionally disk arrays were divided into categories:
  Network attached storage (NAS) arrays
  Storage area network (SAN) arrays:
  Modular SAN arrays
  Monolithic SAN arrays
  Utility Storage Arrays
  Storage virtualization." (footnotes omitted)

Various embodiments of the present invention may be applied to the various types of disk arrays mentioned in the previous paragraphs, as well as to control hardware and/or software for any type of computer data storage system now known or to be developed in the future.

As of 22 Nov. 2021, the Wikipedia entry for "deep packet inspection," states, in part, as follows: "Deep packet inspection (DPI) is a type of data processing that inspects in detail the data being sent over a computer network, and may take actions such as alerting, blocking, re-routing, or logging it accordingly. Deep packet inspection is often used to baseline application behavior, analyze network usage, troubleshoot network performance, ensure that data is in the correct format, check for malicious code, eavesdropping, and internet censorship, among other purposes. There are multiple headers for IP packets; network equipment only needs to use the first of these (the IP header) for normal operation, but use of the second header (such as TCP or UDP) is normally considered to be shallow packet inspection (usually called stateful packet inspection) despite this definition. There are multiple ways to acquire packets for deep packet inspection. Using port mirroring (sometimes called Span Port) is a very common way, as well physically inserting a network tap which duplicates and sends the data stream to an analyzer tool for inspection. Deep Packet Inspection (and filtering) enables advanced network management, user service, and security functions as well as internet data mining, eavesdropping, and internet censorship . . . . DPI is used in a wide range of applications, at the so-called "enterprise" level (corporations and larger institutions), in telecommunications service providers, and in governments."

SUMMARY

According to an aspect of the present invention, there is a method, computer program product and/or system for use with a storage network that includes a storage controller that controls data communications to, in and from the storage network, that performs the following operations (not necessarily in the following order): (i) receiving a request to store a first file in the storage network; (ii) responsive to the receipt of the request, performing deep inspection on data making up the first file to extract a plurality of metadata values; and (iii) determining, by machine logic and based at least in part upon the plurality of metadata values that the first file is characterized by at least one of the following security types: sensitive and/or critical.

DETAILED DESCRIPTION

Figure 1:
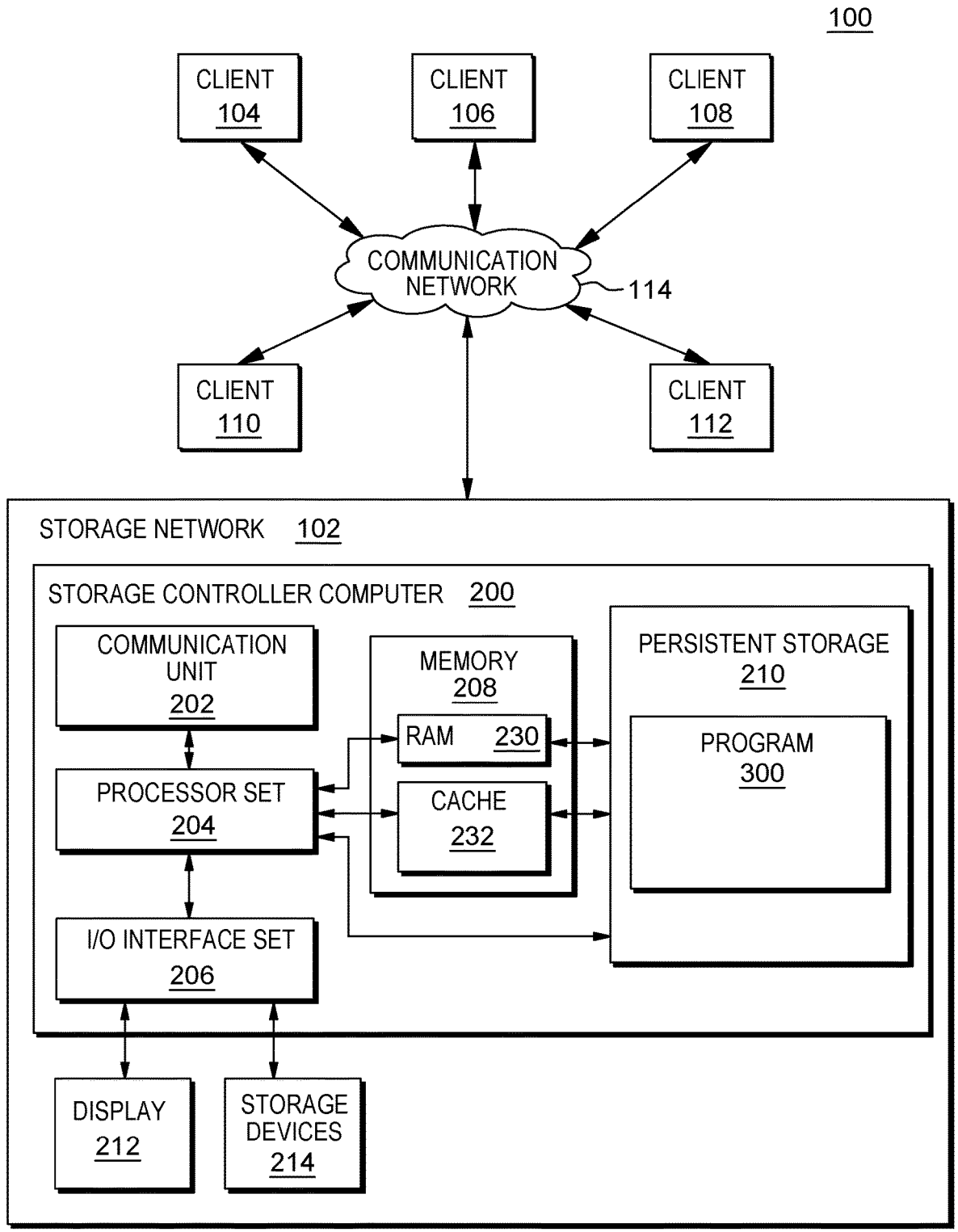
FIG. 1 is a block diagram view of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: storage network 102 (sometimes as also referred to as subsystem 102); client subsystems 104, 106, 108, 110, 112; and communication network 114. Server subsystem 102 includes: storage controller computer 200; communication unit 202; processor set 204; input/output (I/O) interface set 206; memory 208; persistent storage 210; display 212; storage device(s) 214 (in this embodiment, the storage device(s) are in the form of a disk array); random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with storage controller computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
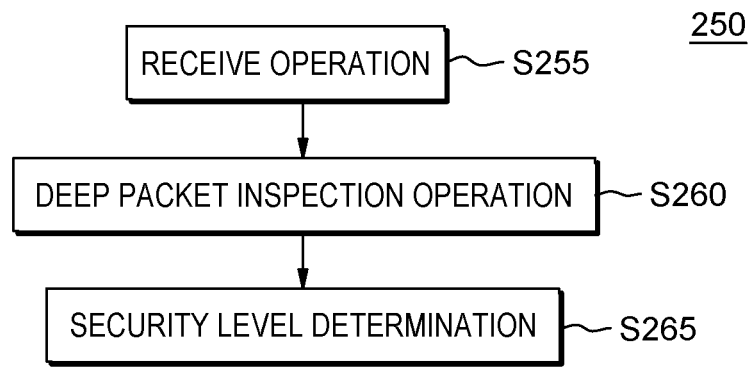
FIG. 2 is a flowchart showing a first embodiment method performed, at least in part, by the first embodiment system.
Figure 3:
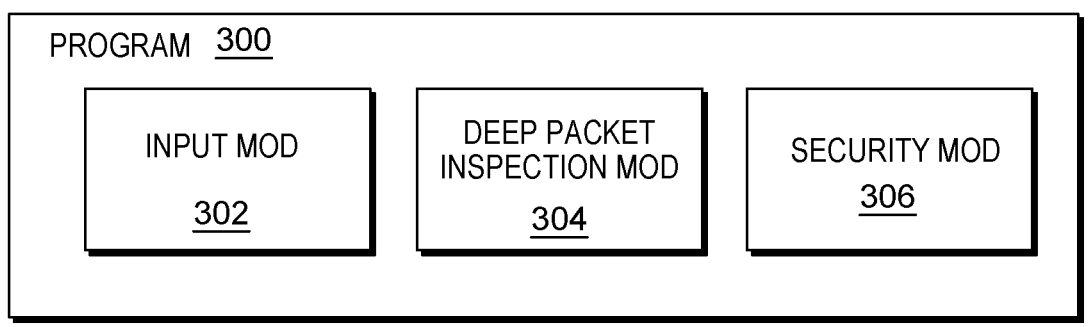
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3. This method is for use with a storage network, which, in this example is system 100. The storage network includes a storage controller, which is storage controller computer 200 in this example. The storage controller controls data communications to, in and from the storage network, using the machine logic of communication control module 302.

Processing begins at operation S255, where input module ("mod") 302 of storage controller computer 200 of storage network 102 receives a request to store a first file in the storage network.

Processing proceeds to operation S260, where deep packet inspection mod 304 performs deep packet inspection on data making up the first file to extract a set of metadata values. This deep packet inspection can be used to determine a security type.

Processing proceeds to operation S265, where security mod 306 determines, based on the metadata values, that the first file is characterized by at least one of the following security types: sensitive and/or critical. The security type (if any) is set in response to the deep packet inspection of the data.

III. Further Comments and/or Embodiments

In today's world, data is the most precious thing. There are various methods, protocols and procedures conventionally used to try to protect and preserve the data. Enterprises put lot of efforts and deploy mechanisms like file auditing, backups, data replication solutions, highly available environments (HA), disaster recovery solutions (DR), business continuity solutions for protecting the data. It is critical that critical data needs to be protected and recovered over the lifespan of it, based on business requirements. Additionally, there is an increased requirement of protecting the data in its un-altered format to protect against malware, ransomware or cyber-attacks. Certain characteristics of this data will now be set forth: (i) it never gets created/stored in a single file system; (ii) it is generally spread across multiple file systems or data sources; (iii) not all of the data is critical to the business/enterprise; (iv) hence, it is important to identify critical data based on the classification mechanism; (v) there is a need to take special actions to protect identified critical data or continuously monitoring critical data for any cyber incident or ransomware attack; and (vi) identified critical data resides on a filesystem and is dynamic in nature.

Data, most of it being unstructured in nature, is growing in the scale of petabytes. Also, it is spread across multiple storage islands in a typical enterprise deployment which produces a "data junkyard." There will not be any basic organization to it unless data has been processed. On the other hand, data is getting generated at such a rapid speed, that it becomes practically challenging to classify the sensitive/critical data across these storage islands where multiple TB s (terabytes) of data are getting generated every day and organizations fail to identify which data needs more protection or which data needs less. This adds inefficiencies to the system which ends up spending unnecessary space on more secured data subsystems for non-sensitive data. Most compliance standards revolve around a protected data set—health records, credit card details, personal information, and more—providing guidance around both optional and mandatory controls used to ensure proper access to, and usage of, that data. The best examples of compliance mandates with easily applicable standards are the Payment Card Industry Data Security Standard (PCI DSS) v3.0 and the European Union's forthcoming General Data Protection Regulation (GDPR).

Security Information and Event Management (SIEM) will now be discussed over the following list of items relating to SIEM: (i) works with huge data captured from various devices in the organization; (ii) helps organizations to accurately detect and prioritize threat across the organization; (iii) typically provides out-of-the-box analytics, correlation rules and dashboards to address organizations security use cases without requiring significant customization efforts; (iv) provides comprehensive insights, quickly detects and prioritize potential threats and gain feedback to continuously improve threat detection; and (v) enhanced monitoring and security based on criticality of data enables frequent monitoring and taking necessary action on the critical data, based on the events reported by security analysis engines.

An example of an ordered scheme of multiple file security levels, which may be used with SIEM and/or various embodiments of the present invention will now be set forth:
1. Security level based on Authorization: Security level based on whether user/group has right access permission based on the ACL (access control list) on the file and auditing for operation for example chmod, chown, etc. on file/directory or a fileset or filesystem;
2. Security level based on Data: Security based on where file/object's data read/write/append/delete operations;
3. Attribute Level Auditing: File level attribute change/append/delete operation will be audited; and
4. Data Movement Level Auditing: Where file/object will be audited based on data copy, replication, movement operations.

Some embodiments of the present invention may include one, or more, of the following operations, features, characteristics and/or advantages: (i) enhanced security threat detection and prevention of security threat of data on the storage controller based on cognitive data classification; (ii) performs classification at a massive scale of data silos to find a candidate (file/object) based on data criticality or importance; (iii) gives special attention to identify, audit and monitor such identified critical data for security threats; (iv) leverages deep data inspection using artificial intelligence (AI) and/or machine learning (ML) techniques such as content analytics, sentiment analytics, contextual views based on natural language classification and/or application programming interfaces (APIs) designed for computer based operations, such as speech to text, visual recognition, etc.; and/or (v) uses the foregoing techniques help in capturing metadata information about data on a storage subsystem.

The operations of a method, according to an embodiment of the present invention and implemented by "controlling software," will now be respectively described in the following paragraphs.

FIRST OPERATION: The controlling software scans metadata from a storage subsystem to capture the system metadata about the files/objects on the storage subsystems. The user can add additional metadata/tags to a set of files/objects based on custom policies. Also, the user can create policies to execute ML/DL (machine learning/deep learning) jobs on a set of files/objects to perform deep inspection of the files and identify files which contain sensitive or critical information and tag the files. Accordingly, for example 'FoundPII'=True or 'FoundCreditCard'=True. Such deep inspection policies trigger deep data inspection leveraging Watson techniques or similar ML/DL technologies, that extracts facets from the candidate (file/object) data and the facets are indexed into data analysis type programs and/or programs that organize unstructured data.

SECOND OPERATION: The controlling software then classifies the data based on criticality or importance of data using various data inspection techniques referenced above. The controlling software uses its Data Security Agent sets, extended attributes or custom metadata tags on files or objects based on data classification and sensitivity level at the data source itself. The file server now has files and objects which are classified by the controlling software with updated tags. When the files are accessed on the file servers, audit logs are generated including the data classification tags. These audit logs are sent to the STEM server for security inspection and security threat analysis. A typical file server may contain billions of files and objects and not all files/objects are important or critical. Hence, un-necessarily auditing and monitoring of these non-important files/objects can burden the STEM server. Now with this data classification already done by modern data organization and/or analysis software, the file systems can send the information of these highly sensitive or important files/objects to the SIEM server along with the file/object access audit logs. The file server queues up these events in different queues (like Kafka topics) based on the AuditLog-Processing-Priority tag and along with the data classification of each of these files.

THIRD OPERATION: The SIEM server then picks up these audit logs from the priority queues such as P1 for high priority and P5 for least priority with different processing rates (for example, process events from P1 queue at higher rate as compared to events from P2 or P3 . . . P5 queues. It helps the SIEM server to prioritize events that are related to high importance/sensitive files to give higher priority and perform optimized threat analysis by applying specialized rules based on data classification. After threat detection and analysis is done by the SIEM server, its security engine can add flags on these important files/objects by adding certain tags for these files implying a specific threat detected with respect to accessing that file and also may set another tag suggesting a specific preventive action that needs to be taken at the filesystem or object store level and passes this information to the file server. These additional security insights about the files/objects help the file server to trigger specialized jobs for taking a certain corrective/prohibitive action on the files identified with certain threats by the SIEM server. These corrective/prohibitive actions may include triggering cyber resiliency workflow such as making data immutable/data encryption of protection mechanism such as taking snapshots or making immutable copies of data on the File Server to safeguard the data against the cyber incident. And these actions can be triggered from the SIEM server based on a particular threat detected and tagged by the SIEM engine for a specific file.

FOURTH OPERATION: Updated flags or tags are sent to a database maintained by the controlling software via a Data Security Agent.

Some embodiments of the present invention may include one, or more, of the following operations, features, characteristics and/or advantages: (i) in a software defined storage (SDS) model where data can reside on commodity off the storage rich shelf servers (COTSS) act as a storage system to store the data; (ii) continual scanning and identification of the critical status of all data in datalakes which is expected to be dynamic and changing from time to time; (iii) leveraging anlytics (in integration with data inspection and classification applications—say Data Security Agent) to flag critical data based on user or organization or contents of a file/object; (iv) leveraging analytics to perform continual scanning of file and object data real time and flagging them to specific priority levels based on their criticality (for example Flag P5—Non-critical data . . . Flag P1—Most Critical data or other tags like FoundPII, FoundCreditCard etc.); (v) once such critical data is tagged with data classification (sensitivity/business criticality level) on the file server using Data Security Agent, these tags are set on the file as extended attributes or the object as custom metadata by the Data Security agent; (vi) this way now, the filesystem/object store is equipped with advanced data classification/tags for each file/object at the data source level itself; (vii) after this, whenever a further data access event occurs on these classified files/objects an audit log is generated containing file/object system and this enriched metadata; and/or (viii) the log is forwarded to the STEM server for threat detection by pushing these audit events to different priority queues (like Kafka topics—P1 . . . P5) based on the priority tag set on the file by Data Security agent.

Some embodiments of the present invention may include one, or more, of the following operations, features, characteristics and/or advantages: (i) now, when such an audit log is received by the SIEM server, that contains data classification and are enqueued to different priority queues; (ii) helps the SIEM server to keep focus on monitoring of the audit events based on their priority by processing events from different queues at different processing rates (such as fastest for P1 and slowest for P5 queue); (iii) in addition, the SIEM server now can perform the threat detection analytics by monitoring these audit events based on the rules configured for the specific type of data based on the data classification tag (for example apply different techniques to a health care data vs financial data and accordingly detect if any anomaly is found in that specific data access or any security breach that is observed analyzing the audit logs); (iv) if a threat is detected, the STEM server then generates an alert, and notifies the fileserver/object store system to take appropriate preventive action on the storage controller; and/or (v) takes pro-active actions and makes most critical data cyber resilient by making immutable copies, encryption of data . . . etc.

Some embodiments of the present invention may include one, or more, of the following operations, features, characteristics and/or advantages: (i) various pro-active actions depend on the identified security incident; (ii) the user can be disabled in case the same file is accessed by the same user from various geographical regions; (iii) Data Protection mechanisms such as snapshot or making immutable copies of data or backing up the data to the backup engines; (iv) starting or pausing the replication of data to other sites in case such data protection techniques are used; and/or (v) by encrypting the data based on threat detection, this addresses the above stated problem uniquely and in an automated fashion.

More methods according to the present invention will now be discussed in the following paragraphs.

Step 1: Proposed disclosure performs classification at a massive scale of data to find a candidate (file/object) to be audited at deep level by leveraging Watson deep data inspection techniques such as IBM Watson Content analytics, Sentiment Analytics, Contextual Views based on natural language classification as well as Watson APIs, such as speech to text, visual recognition, etc. These techniques help in capturing metadata information about the data on the storage subsystem.

Specifically, we first scan metadata from the storage subsystem to understand which of the files/objects contain sensitive or critical information based on the policies defined by the storage admins or in addition to the system defined default policies. Policies trigger deep data inspection leveraging Watson or other similar AI ML/DL techniques (such as the AI services from Microsoft/Google/Amazon or open source techniques such as Apache Tika, TensorFlow, Caffe, etc.) that extracts facets from the candidate (file/object) data and the facets are indexed into IBM Spectrum Discover. The system also sets the data sensitivity classifications and a tag indicating priority of data access event processing at the data source, for example, as an extended attribute to the respective file on the filesystem or a user-defined tag is set for the object in the object store.

This enables previously unattainable levels of auditing and data insight for cyber resiliency. Other techniques such as header extraction may also be used in place of Watson APIs to derive insight about the content of the candidate data for encryption. Additionally, one can make use of IBM StoredIQ which helps identify compliance data like (Personal Information required for GDPR (general data protection regulation) like compliance) which can also be used for identifying and tagging the data for security level.

At the end of Step 1, we have data that is categorized with different compliance or criticality/importance levels.

Note: We do not intend to claim identification and tagging of data for different security level as novel but consider it as an hypothesis for the core claim proposed above.

Step 2: File Server such as IBM Spectrum Scale contains billions of files or objects and it is an exhaustive procedure to detect threat on those billions of files or objects through audit logs. Typically, the file system is configured to send audit logs to the Security Information and Event Management (STEM) Server like IBM QRadar for threat inspection based on rules configured in a SIEM server. The SIEM server can detect threats and notify the administrator or take appropriate action based on the rules configured in case threats are identified. However, all the files/objects in a File Server are not important.

To make this process much more advanced, so that a particular threat for a more critical/important file is detected much faster and an appropriate response/corrective action is taken much quicker than the present state of art techniques, now embodiments of the present invention make use of the data classification and data access event processing priority set by the Data Security agent at the data source level. Whenever, these classified files are accessed on the File Server, audit logs are sent to the SIEM server by pushing those on to different priority queues based on the priority tag set by the Data Security agent on the file/object. Each of these data access audit logs also contain the data classification tags. Then, the SIEM server processes these events from the appropriate event processing queues, so that the data access events pertaining to more critical files can be processed at a much faster rate than the other lower priority file events. The SIEM server then analyzes the data access events based on the priority and the data classification that is associated with these files. It may apply different threat detection techniques on files with different data classification, for example for events pertaining to health care related files like DICOM files or files with Personal Health Information (PHI) information vs events pertaining to files from financial domains like scanned images of a user's personal information like the KYC (Know Your Customer) documents like the users SSN (social security number), Address Proof, Passport Information, Credit Card/Debit Card images, etc. Thus, a combination of data priority and data classification tags help the SIEM server to apply most the appropriate threat detection algorithms suited for the type of data the events are generating from and also processes the most important events at the highest priority level.

In case threats are detected, the SIEM server generates alerts for such files with specific action to mitigate the threats. The SIEM server can send notification to the File Server along with tags on such file(s)/object(s) for better protection of the data by invoking cyber resiliency workflow on the File Server. Based on the tags, the SIEM can either trigger action on the File Server to make data immutable or encrypt the data or protect the data using various methods such as creating immutable snapshots/copies on the File Server. It would result in better model for threat detection and taking preventive action on various heterogenous storage subsystems (like IBM Spectrum Scale, IBM Cloud Object Store, NetApp, EMC Isilon, Amazon S3, Google Cloud Platform etc.). The File Server also updates the tags on such files or objects in IBM Spectrum Discover database using Data Security agent.

At the end of Step 2, the system ensures that the enhanced method for protecting the critical or important data on software defined storage (IBM Spectrum Scale for example) based on enhanced threat detection by the SIEM engine and by invoking cyber resiliency workflow in case of threat detection.

Step 1, Step 2 are continuous process as categorization of data (new as well as old) to different compliance level is also continuous and dynamic.

Following is the method in which IBM Spectrum Discover can be used to classify the data and set priority queue of the critical or important files to be sent to the STEM server for threat detection by monitoring audit logs received from the File Server on different priority queues and then invoking Cyber Resiliency workflow on any data security incident.

Step 1: Applications/users write files/objects to the file systems/object stores.

Step 2: Storage systems is configured to send events containing the system metadata about the files/objects to IBM Spectrum Discover for updating metadata catalogue.

Step 3: These events are put onto a persistent message queue and IBM Spectrum Discover consumers read the events from the queue, normalize them, and insert them into a highly scalable, high performant IBM Spectrum Discover database.

Step 4: Spectrum Discover triggers a policy invoking the Data Security Agent to perform deep data inspection on set of files using AI, ML/DL techniques (like IBM Watson, TensorFlow) or by extracting file headers and additional facets from inspection of the data.

Step 5: Spectrum Discover inserts these extracted facets into the IBM Spectrum Discover DB Step 6: The Data Security agent also connects to the data source and sets the tags with data classification and data sensitivity information (with Tags like FoundPII, FoundCreditCard, FoundPHI, SSNData, Confidential, etc. . . . ) and also sets a tag indicating priority of the files/objects to be audited/monitored on a specific priority by the STEM server, whenever a data access event occurs on these files.

Step 7: The fileservers/object storage systems are pre-configured, such that whenever a file or an object is accessed, an audit log is generated for the accessed files, it also contains the data classification tags and audit-processing-priority tag along with other files access event information. File Server sends the information to the SIEM server, by pushing these events to shared priority queues (like Kafka topics) between the file server and the SIEM server.

Step 8: The SIEM server, on receiving these file access events from the fileserver (or object store), inserts into different priority queues and starts processing these events at the appropriate priority instead of processing all the events with the same priority in absence of such insights. The SIEM server also applies an appropriate threat detecting algorithm based on the data-classification tag for a particular file.

Step 9: With these insights and priorities the SIEM server identifies a potential threat, analyzing the file access event, and suggests an appropriate mitigation action and passes this information to the File Server. This way, it proactively triggers an appropriate action based on the detected mitigation technique (creating a snapshot or invoking cyber resiliency workflow or making file immutable or file encryption) as per defined in the additional tags.

Step 10: After invoking proactive mitigation actions, the File Server also updates the Spectrum Discover Database with this updated tag against each file/object using automated live event-based indexing technique configured with the IBM Spectrum Discover system.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer implemented method (CIM) for use with a storage network that includes a storage controller that controls data communications to, in and from the storage network, the CIM comprising:
receiving a request to store a first file in the storage network;
responsive to the receipt of the request, performing deep inspection on data making up the first file to extract a plurality of metadata values;
determining, by machine logic and based at least in part upon the plurality of metadata values that the first file is characterized by at least one of the following security types: sensitive and critical;
based on the determination that the first file is characterized by at least one of the security types, tagging the first file, at a data source of the first file, with one or more tags indicating a classification of the data associated with the first file and a security level, and further indicating a priority level for processing a data access event associated with the first file based on the classification and the security level;
receiving a plurality of audit logs on files in the storage network of at least one of the security types based on the classification and the security level associated with each file, wherein the plurality of audit logs further comprises an audit log associated with the first file;
prioritizing, by applying an artificial intelligence algorithm, the plurality audit logs based on the one or more tags associated with each file and indicating the priority level such that different audit logs are enqueued to different priority queues for processing at different processing rates;
determining, based on the plurality of audit logs, that the data access event associated with the first file represents a potential threat to the storage network; and
based on the determination that the data access event associated with the first file represents a potential threat to the storage network, tagging the first file with additional tags indicating a specific threat detected with respect to accessing the first file and indicating a specific preventive action.

2. The CIM of claim 1, wherein tagging the first file, at the data source of the first file, with the one or more tags indicating the security level further comprises:
characterizing the first file according to a predetermined ordered scheme of a plurality of file security levels including a first security level, with the first security level being based on authorization such that a given user or group has right access permission for the first file based on an access control list (ACL) included in the first file.

3. The CIM of claim 1, wherein tagging the first file, at the data source of the first file, with the one or more tags indicating the security level further comprises:
characterizing the first file according to a predetermined ordered scheme of a plurality of file security levels including a first security level, with the first security level being based on data corresponding to the data operations performed with respect to the first file including read, write, append, and delete operations.

4. The CIM of claim 1, wherein tagging the first file, at the data source of the first file, with the one or more tags indicating the security level further comprises:
characterizing the first file according to a predetermined ordered scheme of a plurality of file security levels including a first security level, with the first security level being based on attribute level auditing under which file level attribute operations of the first file will be audited including change, append, and delete operations.

5. The CIM of claim 1, wherein tagging the first file, at the data source of the first file, with the one or more tags indicating the security level further comprises:
characterizing the first file according to a predetermined ordered scheme of a plurality of file security levels including a first security level, with the first security level being based on data movement level auditing where the first file is audited based on data copy, replication and movement operations.

6. A computer program product (CPP) for use with a storage network that includes a storage controller that controls data communications to, in and from the storage network, the computer program product comprising:
a set of storage device(s); and
computer code stored collectively in the set of storage device(s), with the computer code including data and instructions to cause a processor(s) set to perform at least the following operations:
receiving a request to store a first file in the storage network;

responsive to the receipt of the request, performing deep inspection on data making up the first file to extract a plurality of metadata values;

determining, by machine logic and based at least in part upon the plurality of metadata values that the first file is characterized by at least one of the following security types: sensitive and critical;

based on the determination that the first file is characterized by at least one of the security types, tagging the first file, at a data source of the first file, with one or more tags indicating a classification of the data associated with the first file and a security level, and further indicating a priority level for processing a data access event associated with the first file based on the classification and the security level;

receiving a plurality of audit logs on files in the storage network of at least one of the security types based on the classification and the security level associated with each file, wherein the plurality of audit logs further comprises an audit log associated with the first file;

prioritizing, by applying an artificial intelligence algorithm, the plurality audit logs based on the one or more tags associated with each file and indicating the priority level such that different audit logs are enqueued to different priority queues for processing at different processing rates;

determining, based on the plurality of audit logs, that the data access event associated with the first file represents a potential threat to the storage network; and based on the determination that the data access event associated with the first file represents a potential threat to the storage network, tagging the first file with additional tags indicating a specific threat detected with respect to accessing the first file and indicating a specific preventive action.

7. The CPP of claim 6, wherein tagging the first file, at the data source of the first file, with the one or more tags indicating the security level further comprises:

characterizing the first file according to a predetermined ordered scheme of a plurality of file security levels including a first security level, with the first security level being based on authorization such that a given user or group has right access permission for the first file based on an access control list (ACL) included in the first file.

8. The CPP of claim 6, wherein tagging the first file, at the data source of the first file, with the one or more tags indicating the security level further comprises:

characterizing the first file according to a predetermined ordered scheme of a plurality of file security levels including a first security level, with the first security level being based on data corresponding to the data operations performed with respect to the first file including read, write, append, and delete operations.

9. The CPP of claim 6, wherein tagging the first file, at the data source of the first file, with the one or more tags indicating the security level further comprises:

characterizing the first file according to a predetermined ordered scheme of a plurality of file security levels including a first security level, with the first security level being based on attribute level auditing under which file level attribute operations of the first file will be audited including change, append, and delete operations.

10. The CPP of claim 6, wherein tagging the first file, at the data source of the first file, with the one or more tags indicating the security level further comprises:

characterizing the first file according to a predetermined ordered scheme of a plurality of file security levels including a first security level, with the first security level being based on data movement level auditing where the first file is audited based on data copy, replication and movement operations.

11. A computer system (CS) for use with a storage network that includes a storage controller that controls data communications to, in and from the storage network, the computer system comprising:

a processor(s) set;

a set of storage device(s); and computer code stored collectively in the set of storage device(s), with the computer code including data and instructions to cause the processor(s) set to perform at least the following operations:

receiving a request to store a first file in the storage network;

responsive to the receipt of the request, performing deep inspection on data making up the first file to extract a plurality of metadata values;

determining, by machine logic and based at least in part upon the plurality of metadata values that the first file is characterized by at least one of the following security types: sensitive and critical;

based on the determination that the first file is characterized by at least one of the security types, tagging the first file, at a data source of the first file, with one or more tags indicating a classification of the data associated with the first file and a security level, and further indicating a priority level for processing a data access event associated with the first file based on the classification and the security level;

receiving a plurality of audit logs on files in the storage network of at least one of the security types based on the classification and the security level associated with each file, wherein the plurality of audit logs further comprises an audit log associated with the first file;

prioritizing, by applying an artificial intelligence algorithm, the plurality audit logs based on the one or more tags associated with each file and indicating the priority level such that different audit logs are enqueued to different priority queues for processing at different processing rates;

determining, based on the plurality of audit logs, that the data access event associated with the first file represents a potential threat to the storage network; and based on the determination that the data access event associated with the first file represents a potential threat to the storage network, tagging the first file with additional tags indicating a specific threat detected with respect to accessing the first file and indicating a specific preventive action.

12. The CS of claim 11, wherein tagging the first file, at the data source of the first file, with the one or more tags indicating the security level further comprises:

characterizing the first file according to a predetermined ordered scheme of a plurality of file security levels including a first security level, with the first security level being based on authorization such that a given user or group has right access permission for the first file based on an access control list (ACL) included in the first file.

13. The CS of claim 11, wherein tagging the first file, at the data source of the first file, with the one or more tags indicating the security level further comprises:
characterizing the first file according to a predetermined ordered scheme of a plurality of file security levels including a first security level, with the first security level being based on data corresponding to the data operations performed with respect to the first file including read, write, append, and delete operations.

14. The CS of claim 11, wherein tagging the first file, at the data source of the first file, with the one or more tags indicating the security level further comprises:
characterizing the first file according to a predetermined ordered scheme of a plurality of file security levels including a first security level, with the first security level being based on attribute level auditing under which file level attribute operations of the first file will be audited including change, append, and delete operations.

15. The CS of claim 11, wherein tagging the first file, at the data source of the first file, with the one or more tags indicating the security level further comprises:
characterizing the first file according to a predetermined ordered scheme of a plurality of file security levels including a first security level, with the first security level being based on data movement level auditing where the first file is audited based on data copy, replication and movement operations.

* * * * *